(12) United States Patent
Shah

(10) Patent No.: US 9,951,881 B2
(45) Date of Patent: Apr. 24, 2018

(54) SOLENOID OPERATED UNIT FOR DETECTING AND BLEEDING UNDESIRED FLUID

(71) Applicant: ROTEX AUTOMATION LIMITED, Vadodara, Gujarat (IN)

(72) Inventor: Nirav R Shah, Gujarat (IN)

(73) Assignee: ROTEX AUTOMATION LIMITED, Gujarat (IN)

(*) Notice: Subject to any disclaimer, the term of this patent is extended or adjusted under 35 U.S.C. 154(b) by 193 days.

(21) Appl. No.: 14/711,786

(22) Filed: May 14, 2015

(65) Prior Publication Data

US 2016/0271523 A1 Sep. 22, 2016

(30) Foreign Application Priority Data

Mar. 20, 2015 (IN) .......................... 921/MUM/2015

(51) Int. Cl.
| | |
|---|---|
| *F02M 37/22* | (2006.01) |
| *B01D 17/02* | (2006.01) |
| *F16K 27/02* | (2006.01) |
| *F16K 31/06* | (2006.01) |
| *F16K 37/00* | (2006.01) |
| *F16K 17/19* | (2006.01) |
| *B01D 17/12* | (2006.01) |
| *F02M 25/08* | (2006.01) |

(52) U.S. Cl.
CPC ...... *F16K 31/0672* (2013.01); *B01D 17/0214* (2013.01); *B01D 17/12* (2013.01); *F02M 37/221* (2013.01); *F16K 17/19* (2013.01); *F16K 27/0236* (2013.01); *F16K 37/0025* (2013.01); *F02M 2025/0863* (2013.01)

(58) Field of Classification Search
CPC .......... F02M 2025/0863; F02M 37/221; F16K 31/0672; F16K 17/19; F16K 37/0025; F16K 27/0236; B01D 17/12; B01D 17/0214
USPC ............... 137/572, 172, 177, 552, 558, 559; 73/61.44, 304 R; 324/694, 697
See application file for complete search history.

(56) References Cited

U.S. PATENT DOCUMENTS

| | | | | | |
|---|---|---|---|---|---|
| 2,310,298 | A | * | 2/1943 | Kuhl ........................ | G05D 9/12 137/172 |
| 3,131,335 | A | * | 4/1964 | Berglund .............. | G01F 23/241 137/392 |
| 4,028,444 | A | * | 6/1977 | Brown .................. | A61M 16/16 128/200.13 |
| 4,304,132 | A | * | 12/1981 | Snaper .................. | F02D 33/003 340/620 |
| 4,539,109 | A | * | 9/1985 | Davis .................... | F02D 33/003 123/557 |
| 4,595,916 | A | * | 6/1986 | Snaper .................... | G01F 23/22 244/135 R |

(Continued)

*Primary Examiner* — John K Fristoe, Jr.
*Assistant Examiner* — Josephine Trinidad-Borges

(57) ABSTRACT

A solenoid operated unit for detecting and bleeding undesired liquid present in desired liquid of different resistivity and specific gravity, the two liquids being immiscible with each other; with an electrical arrangement having a pair of parallel sensor pins and a pair of serial sensor pins. A dual function diaphragm ensures suitability for use with contaminated fluids. A pressure equalization outlet ensures smooth and speedy bleeding of undesired liquid. A modular mechanical sensor, when provided, provides redundancy such that desired fluid is not drained in situations of any electro-mechanical failure.

11 Claims, 11 Drawing Sheets

(56) References Cited

U.S. PATENT DOCUMENTS

| | | | | |
|---|---|---|---|---|
| 6,217,752 B1* | 4/2001 | Coots | ............... | G01F 23/185 |
| | | | | 116/109 |
| 6,879,935 B2* | 4/2005 | Keck | ............... | G01F 23/00 |
| | | | | 210/742 |
| 2014/0261773 A1* | 9/2014 | Chajec | ............... | G05D 9/12 |
| | | | | 137/395 |

* cited by examiner

US 9,951,881 B2

SOLENOID OPERATED UNIT FOR DETECTING AND BLEEDING UNDESIRED FLUID

The following specification particularly describes the invention and the manner in which it is to be performed.

FIELD OF INVENTION

The present invention relates to detection and separation of two immiscible liquids from each other and particularly to detection of a liquid which has relatively higher density and conductivity. More particularly the invention relates to detection of such liquid electrically as well as mechanically.

BACKGROUND

Undesirable presence of one liquid in another is common. The background here focusses on those liquids which are immiscible with respect to each other. Further, only those liquids are in purview which have densities or different specific gravities with respect to each other. A commonly occurring situation fitting such boundary conditions is water which could be present in different kinds of fluids like diesel, gasoline, lubricants, et cetera. Dirt and other contaminations also ingress in fuels during transportation, mixing or storage process. Undesirable liquids, like water, can cause severe performance problems with the equipment. Conducting fluids can cause the fuel injector tips to explode, resulting in expensive repairs. Slugs of water in the fuel can cause sudden cooling in the engine and may result in shortened engine life. Excessive water can reduce the lubricating qualities of the fuel and cause injector seizure and contingent engine damage. In addition, fungus and bacteria live in water. As a result, diesel fuel needs to be filtered essentially before injecting the diesel fuel into the engine. The problems that can be caused due to contaminants and water can be a significant matter of concern. When water encumbered diesel fuel is run through a fuel system and engine, the presence of free water could result the fuel system to malfunction enormously due to rust, corrosion, deposits, etc. all of which affect the life of the machine. Undesired liquids therefore need to be detected, separated and removed.

Removal of such undesired fluid can be carried out manually by opening the appropriate outlet port. However, manual removal is only possible when there is no likelihood of useful fluid draining out inadvertently. Further, it causes inconvenience like switching off the device, and waiting for the undesired fluid to exit.

U.S. Pat. No. 6,783,665 B1 discloses a unit for automatically bleeding out water avoiding lengthy time and uncomfortable manual operations by using a sensor positioned in the collection chamber to undergo activation when the water level reaches a pre-determined maximum value. The invention uses a float assisted electrical sensor, like magnetic reed switch, and other known components. The disclosure does not elaborate construction of detecting arrangement which would ensure reliable mechanical-electrical co-ordination, and around which the unit functions. JP1984041654A, likewise, discloses an improved fuel water separator allowing efficient separation of water and associated bacterial contaminants from fuel and to keep off the outflow of fuel oil. It is done by opening a drain solenoid valve when separated water from a water sump in a fuel filter is collected more than a fixed water level, and discharging the separated water out automatically, while closing the said valve without fail when it comes into a specified low level.

Detecting presence of a liquid by its conductivity is a matter of fundamental Physics and a known art. Patent publication no US20100276352 discloses a fuel filter having water level sensor with 2 electric conductors which can be electrically interconnected by means of water if there is correspondingly high water and working on the principle of electrical resistivity. Such conductors or pins used for detecting water in fuel are commonly known as "water in fuel" pins or WIF pins. Up to three pins are commonly deployed. Patent publication no US20060070956A1, US20130285678 and US20110259802 disclose 3 pins use, achieving the objectives by providing a method for separating water from a liquid having a lighter density, by sensing the water level in the water collecting area with a water sensor and transmitting a signal indicating the sensed water level to a microprocessor. When the sensed water level in the water collecting area reaches or exceeds a predetermined maximum, the microprocessor activating the water discharge device to discharge water from water collecting area through the water outlet. An electrical resistance of the Water-in-fuel sensor changes based upon whether the qualified filter element is installed in the housing.

Many a time, the undesired liquid and or the main fluid has dirt and other micro-contamination which impair the functioning of the detection and removal over a long duration. When the undesired fluid, say water, is being bled out, a low pressure gets progressively created in the fluid vessel, which mars the steady exiting of the undesired fluid. Most designs have no redundancy. Such basic requirements are not catered to by earlier designs and which this invention effectively meets.

OBJECTIVE OF INVENTION

The objective is to invent a solenoid operated unit for detecting and removing immiscible liquid from another fluid of lower specific gravity and lower electrical conductivity.

Another objective is to invent a solenoid operated unit suitable for contaminated liquids.

Yet another objective is to ensure smooth and unhindered removal of undesired fluid.

Yet another objective is to have redundancy such that desired fluid is not inadvertently removed due to malfunctioning.

SUMMARY OF INVENTION

The solenoid operated unit as per this invention is suitable for any two immiscible liquids of different specific gravity and electrical resistivity.

The inventive solenoid operated unit is mounted at the bottom of a vessel, which illustratively contains diesel and water. A specific gravity of the water being higher than a specific gravity of the diesel, the water occupies the bottom most place in the vessel.

The solenoid operated unit has an electrical arrangement comprising of a pair of parallel sensor pins and a pair of series sensor pins. The electrical arrangement further comprises of three resistances R1, R2 and R3. The electrical arrangement is driven by a source voltage Vcc and a potential output VE is connected to a control unit which energizes the solenoid when the potential output VE is less than a pre-set trigger value for the control unit.

The ohmic value of the resistance R2 is more than 50 to 200 times the ohmic value of the resistance R1 and the resistance R3. The distance between the parallel sensor pins and distance between the serial sensor pins is such that the ohmic value of a resistance between the parallel sensor pins, as also the ohmic value of a resistance between the serial sensor pins is nearly half of the ohmic value of R3, when surrounded by undesired fluid, here, water.

Three scenarios are defined thus:

Scenario ONE—When all the sensor pins are surrounded by desired fluid having high resistivity, and in such a situation, the potential output VE is nearly equal to the source voltage Vcc.

Scenario TWO—When the parallel sensor pins are surrounded by desired fluid having high resistivity, and the serial sensor pins are surrounded by undesired fluid of low resistivity, and in such a situation, the potential output VE is nearly half of the source voltage Vcc.

Scenario THREE—When all the sensor pins are surrounded by undesired fluid having low resistivity, and in such a situation, the potential output VE (50) is less than 40% of the source voltage Vcc.

The solenoid operated unit also has an electro-mechanical arrangement comprising of a static core which is fixed and which is made of a ferromagnetic material, a solenoid, a plunger which is movable and which is made of a ferromagnetic material surrounding or surrounded by the solenoid.

The solenoid operated unit also has a mechanical arrangement comprising of a vertical bleeding path and an exit path. The vertical bleeding path has a sump at a top end, an upper opening at the top end and a lower opening at a bottom end. The exit path is connected and disconnected with the lower opening by a dual function diaphragm. The mechanical arrangement also comprises of a compression spring.

The dual function diaphragm is made of a soft material having compatibility to work in fluids that the solenoid operated unit is used for. An annular part of the dual function diaphragm seals and insulates the electro-mechanical arrangement from the mechanical arrangement. A nuclear part of the dual function diaphragm blocks and unblocks the lower opening of the vertical bleeding path and thereby, correspondingly, disconnects and connects the lower opening from the exit path. The head of the plunger is gripped by the cap like construction provided on the other side of the nuclear part such that a rectilinear movement of the plunger results in corresponding movement of the annular part.

The mechanical arrangement also comprises of a pressure equalization outlet, provided with a compensation valve.

The mechanical arrangement also has provision for providing a modular mechanical sensor assembly, comprising of a spherical ball and a tunnel. The spherical ball is made of such material that the spherical ball floats on the undesired liquid, here water, while the spherical ball sinks in the desired liquid, here, diesel. The spherical ball is trapped in the tunnel closed at one end. The tunnel has pressure equalizing openings all around its length. The tunnel also has a plurality of convex guides all along its length which have point contact with the spherical ball so as to cause minimum friction during the up and down movement of the spherical ball. The tunnel has provisions for fixation on top of the solenoid operated unit. When the modular mechanical sensor assembly is fixed on the solenoid operated unit and the vessel has the desired fluid, the spherical ball sinks and sits on the upper opening such that the spherical ball blocks the opening completely and the desired fluid cannot enter the vertical bleeding path.

The pressure equalizing openings are essentially a plurality of openings all around the cylindrical part of the tunnel, located such that the fluid pressure around the spherical ball is uniform and the spherical ball suspends freely.

When the solenoid is de-energized, the plunger and the static core do not have magnetic behavior. Due to the presence of the compression spring, the plunger remains away from the static core. In turn, the plunger pushes the annular part of the dual function diaphragm on to the lower opening of the vertical bleeding path, thereby blocking the lower opening and disconnecting the lower opening from the exit path. When the solenoid is energized, the plunger and the static core get magnetized with opposite polarity facing each other and the plunger gets pulled by the static core after overcoming the force of compression spring. In this condition, the annular part of the dual function diaphragm moves away from the lower opening thereby connecting the exit path with the lower opening.

When the vessel is filled with desired fluid, all the sensor pins are surrounded by desired fluid having high resistivity, creating scenario ONE. The potential output VE is higher than the pre-set trigger value; and the solenoid remain de-energized. The plunger keeps the annular ring pushed against the lower opening. Hence desired fluid cannot come out.

When undesired fluid, here water, having higher specific gravity than desired fluid, here diesel, is present in the diesel, the water settles down and the level of water starts rising till the water surrounds the pair of serial sensor pins resulting into scenario TWO. The solenoid continues to remain de-energized and thus the lower opening remains blocked by the nuclear part of the dual function diaphragm. As the level of the water rises further so as to touch the pair of parallel sensor pin, scenario THREE is achieved, resulting into the potential output VE falling below the pre-set trigger value which causes the control unit to energize the solenoid. Consequently, the plunger and the static core get magnetized and the plunger is pulled towards the static core. It further results in the nuclear part unblocking the lower opening and the vertical bleeding path joins with the exit path and the water is enabled to be bled out due to the pressure of the column of diesel above the water.

The control unit keeps the solenoid energized till scenario TWO situation re-occurs.

Since the water is trapped below the diesel, a vacuum starts getting created as the water bleeds and the exiting of water becomes intermittent and slow. The pressure equalization outlet is provided to resolve this conflict. The vacuum results into a differential pressure with respect to the atmospheric pressure and the compensation valve allows the flow of atmospheric air from an atmospheric pressure end to an inner end. Consequently, the exiting of water is smooth and speedy.

As the water drains out and its level falls resulting into scenario TWO, the solenoid de-energizes through the control unit. This causes the plunger to be pushed away from the static core and the head of the plunger pushes up the nuclear part of the dual function diaphragm. The nuclear part of the dual function diaphragm blocks the lower opening thus.

The modular mechanical sensor assembly, when mounted on the solenoid operated unit provides redundancy in order to ensure that in no circumstances the desired fluid is drained out. Consequent to any malfunction, whether mechanical or electro-mechanical, if the plunger remains in energized or interim position while the water level has fallen below the pair of serial sensor pins, the spherical ball sinks and sits on the upper opening and blocks the upper opening completely, thus preventing unwanted drainage of the desired fluid. The malfunction could be—compression spring losing its strength, coil failing to de-energize, permanent magnetism setting in the plunger, the plunger getting stuck, or any other failure.

The energizing and de-energizing of the solenoid is executed by the control unit, by virtue of processing the potential output VE as generated in scenario ONE, scenario TWO and scenario THREE. As an example, the vessel may have provision to measure temperature and the control unit may energize and de-energize the solenoid according to desired temperature parameters, processed in consonance with the scenario ONE, scenario TWO and or scenario THREE.

DETAILED DESCRIPTION OF INVENTION

The invention shall now be described with the help of drawings. The terms and illustration are merely for describing the invention and should not be construed to limit the invention. Properties of water are considered here to illustrate undesired liquid while properties of diesel are considered to illustrate desirable fluid. However, the unit as per this invention is suitable for any two immiscible liquids of different specific gravity and electrical resistivity.

Figure 1:
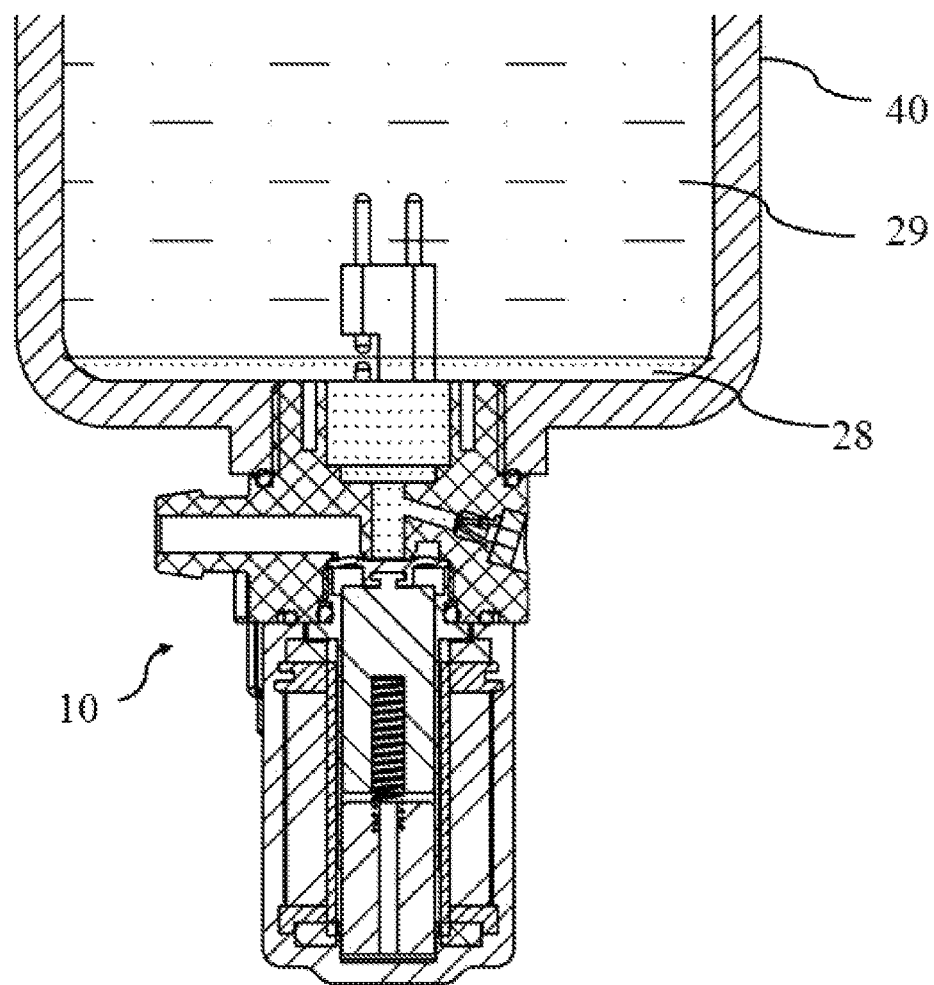
FIG. 1 shows a solenoid operated unit fitted at the bottom of a vessel substantially containing desired fluid, here diesel, and a small quantity of undesired fluid, here, water. The solenoid is in a de-energized condition.
Figure 2:
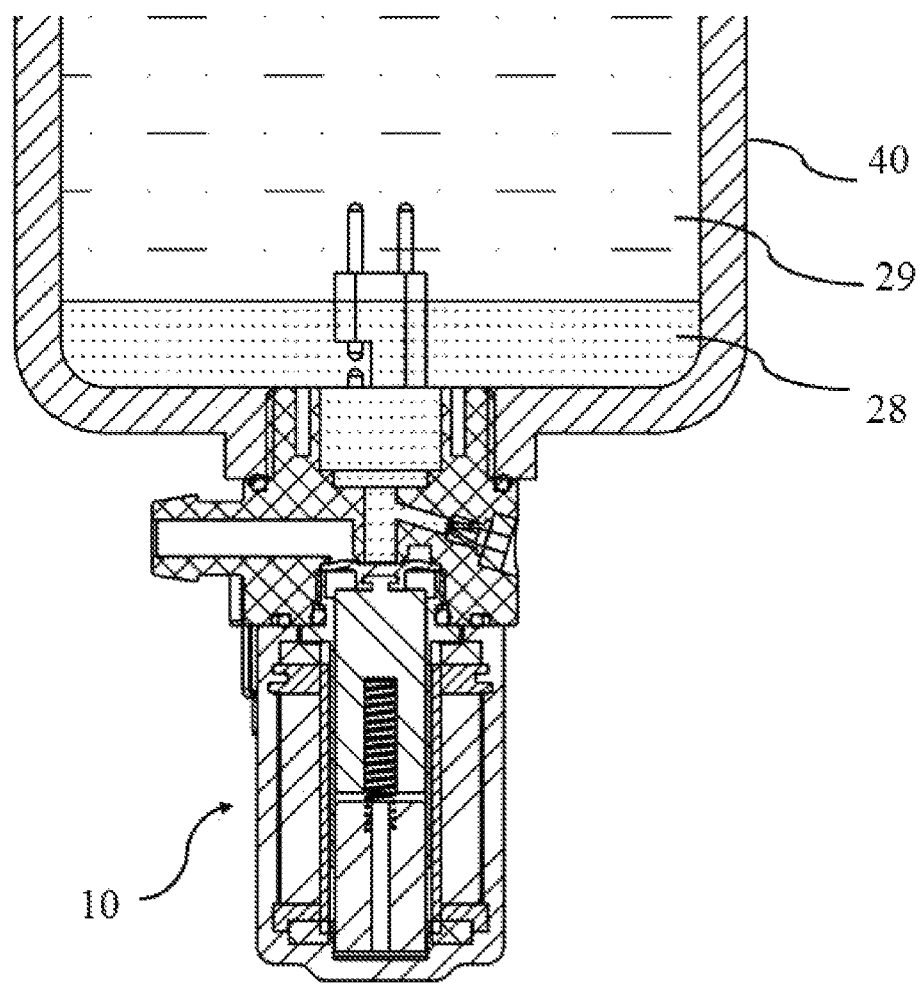
FIG. 2 shows the solenoid operated unit fitted at the bottom of the vessel substantially containing diesel and relatively more quantity of water, while the solenoid is still in the de-energized condition though the level of undesirable liquid is above a pair of serial sensor pins.
Figure 3:
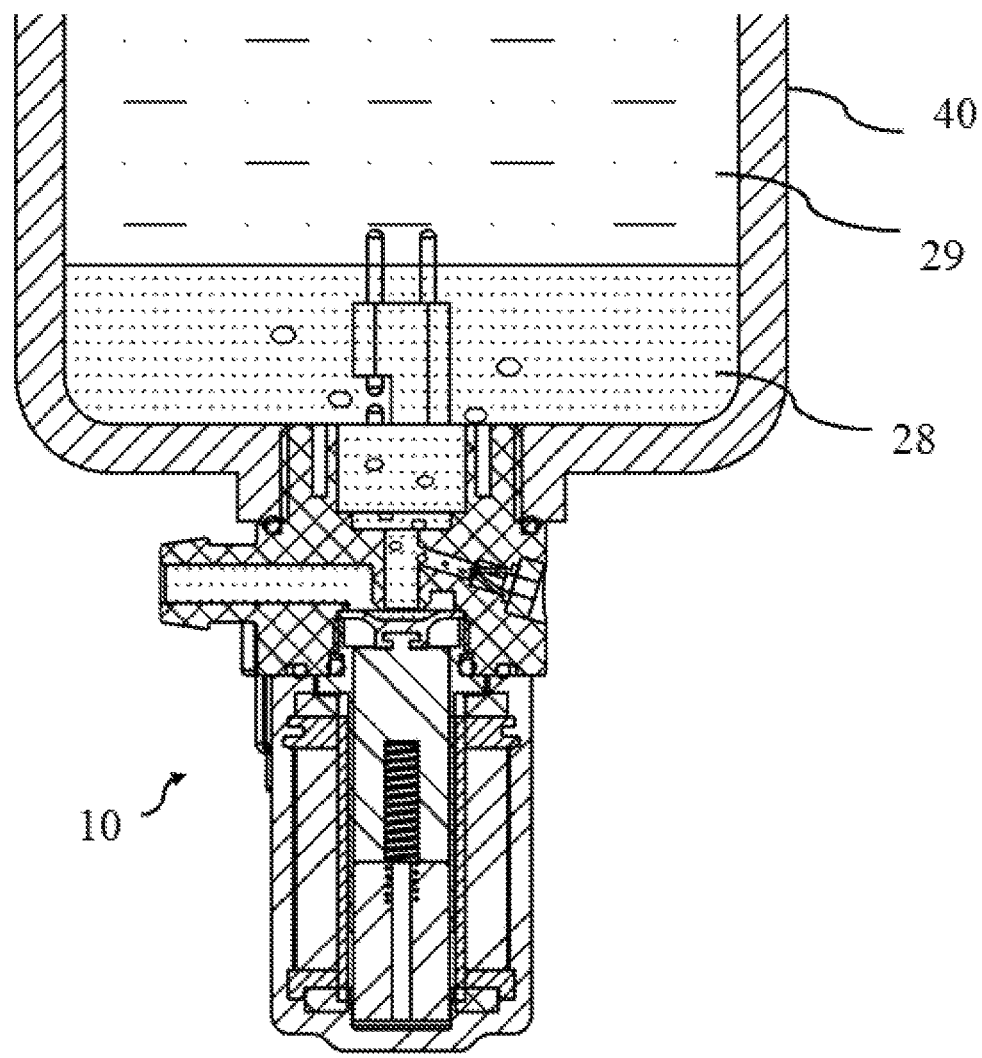
FIG. 3 shows the solenoid operated unit fitted at the bottom of the vessel containing diesel and water level touching a pair of parallel sensor pins, solenoid in an energized condition resulting into water bleeding.

As shown in FIGS. 1, 2 and 3 a solenoid operated unit (10) is mounted at a bottom of a vessel (40), which contains a diesel (29) and a water (28). A specific gravity of the water being higher than a specific gravity of the diesel, the water (28) occupies the bottom most place in the vessel (40).

Figure 4:
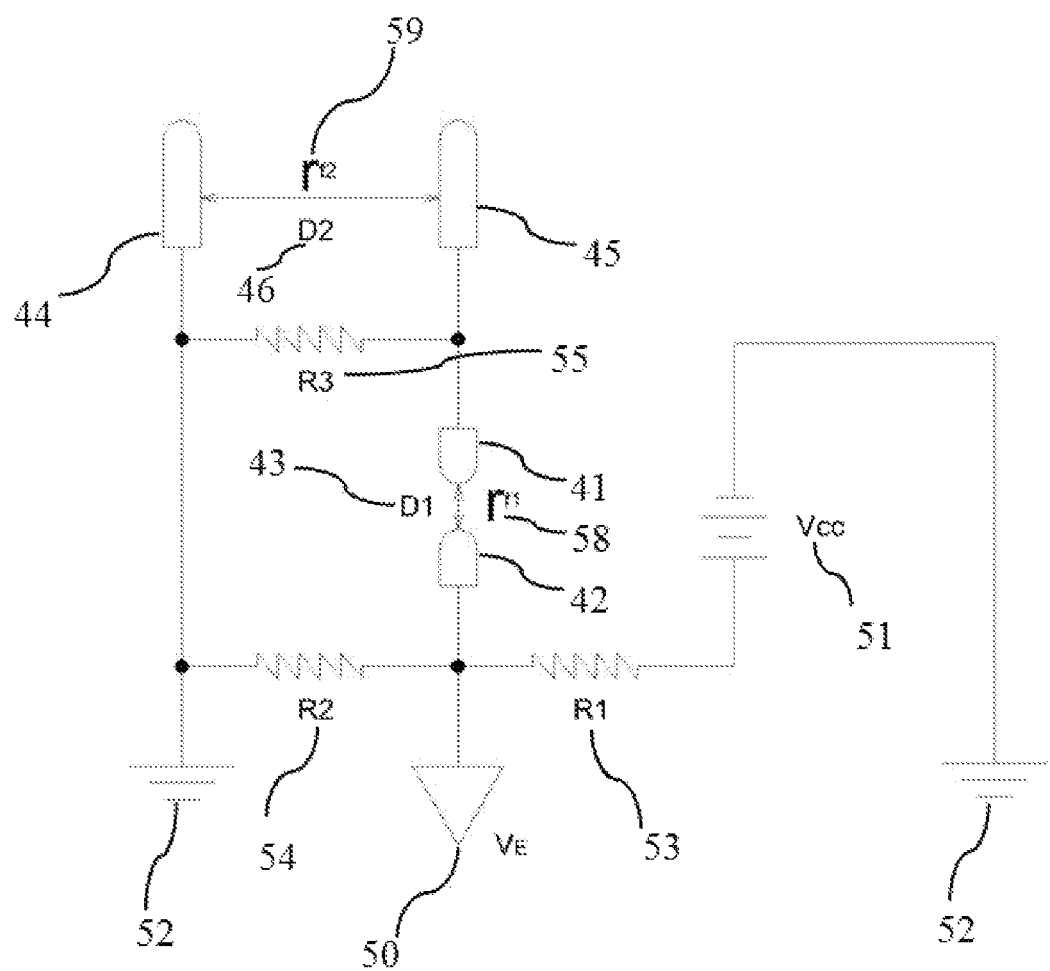
FIG. 4 shows schematic diagram of electrical circuit deploying a pair of parallel sensor pins and a pair of serial sensor pins, when the surroundings is desired fluid, in this case diesel.
Figure 5:
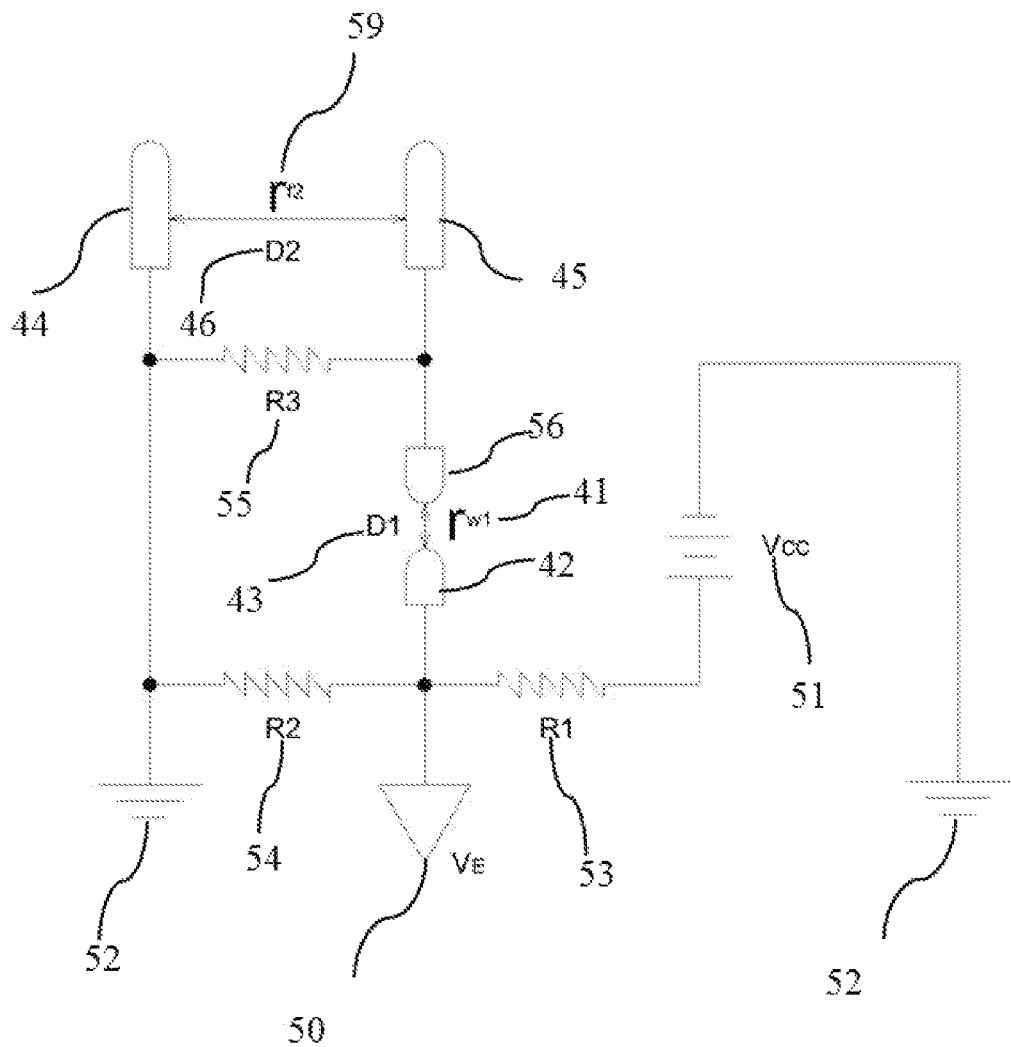
FIG. 5 shows schematic diagram of electrical circuit deploying the sensor pins, when the surroundings is partially the desirable fluid and partly the undesired liquid, in this case, water.
Figure 6:
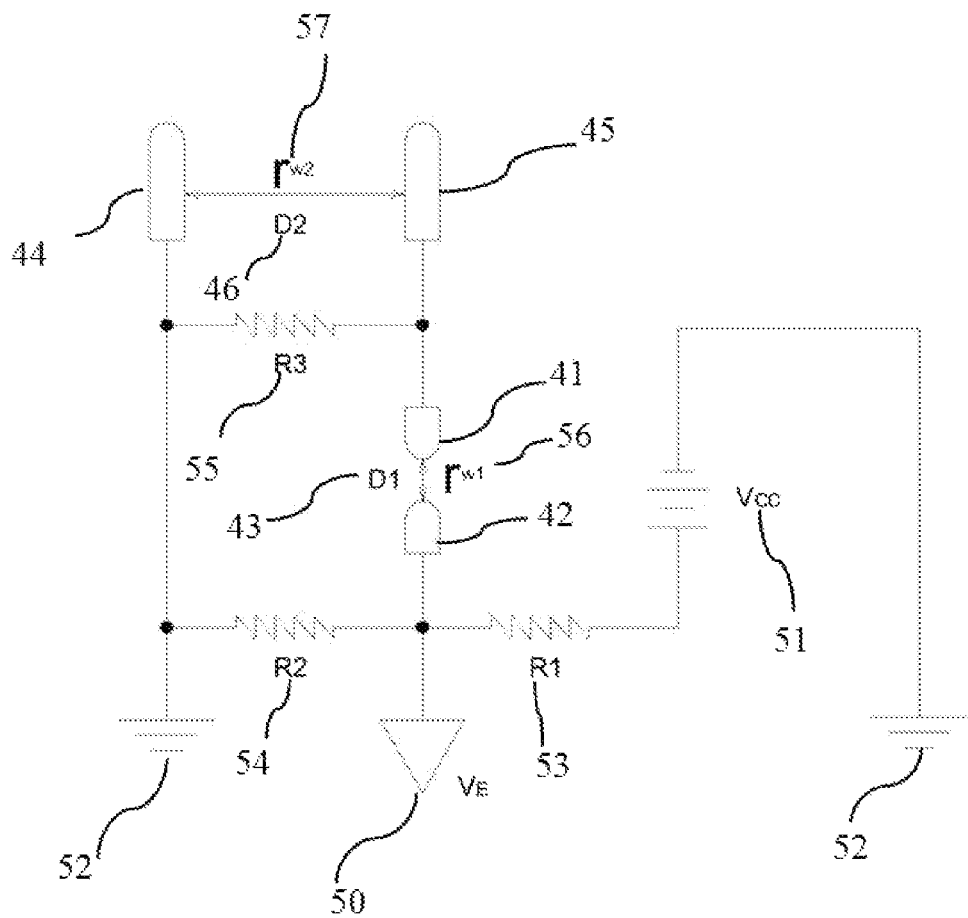
FIG. 6 shows schematic diagram of electrical circuit deploying sensor pins, when the surroundings is water.

The solenoid operated unit (10) has an electrical arrangement as shown in FIGS. 4, 5 and 6. The electrical arrangement comprises of a pair of parallel sensor pins (44, 45) and a pair of series sensor pins (41, 42). The electrical arrangement further comprises of a resistances R1 (53), a resistance R2 (54) and a resistance R3 (55) in the formation shown in FIGS. 4, 5 and 6. The electrical arrangement is driven by a source voltage Vcc (51); and a potential output VE (50) is connected to a control unit (not shown) which energizes a solenoid (11) when a potential output VE (50) is less than a pre-set trigger value for the control unit.

An ohmic value of the resistance R2 (54) is more than 50 to 200 times an ohmic value of the resistance R1 (53) and an ohmic value of the resistance R3 (55). A distance D2 (46) between the pair of parallel sensor pins (44, 45) and a distance D1 (43) between the pair of serial sensor pins (41, 42) is such that an ohmic value of a resistance $r_{w2}$ (57) between the pair of parallel sensor pins (44, 45), as also an ohmic value of a resistance $r_{w1}$ (56) between the pair of serial sensor pins (41, 42) is nearly half of the ohmic value of the resistance R3 (55), when surrounded by an undesired fluid, here, water (28).

Three scenarios are defined thus:

Scenario ONE—When all the sensor pins i.e. the pair of parallel sensor pins (44, 45) and the pair of series sensor pins (41, 42) are surrounded by a desired fluid having a high resistivity, which implies a very high ohmic value of resistance between the pair of parallel sensor pins (44, 45) and also a very high ohmic value of the resistance between the pair of series sensor pins (41, 42), which approximates to an open circuit between the pair of parallel sensor pins (44, 45) and also between the pair of series sensor pins (41, 42); in such a situation, the potential output VE (50) is nearly equal to the source voltage Vcc (51). FIG. 4.

Algebraically, $VE = Vcc \times R_2/(R_1+R_2)$

Scenario TWO—When the pair of parallel sensor pins (44, 45) are surrounded by the desired fluid having high resistivity, which implies a very high ohmic value of the resistance between the pair of sensor pins (44, 45) which approximates to the open circuit between the parallel pins (44, 45); and the pair of serial sensor pins (41, 42) are surrounded by the undesired fluid of low resistivity, which implies a lower ohmic value of the resistance between the pair of series sensor pins (41, 42) than the resistance R3 (55); in such a situation, the potential output VE (50) is nearly half of the source voltage Vcc (51). FIG. 5

Algebraically, $$VE = \frac{Vcc \times [(R_3 + r_{w1}) \times R_2 / (R_3 + r_{w1} + R_2)]}{[(R_3 + r_{w1}) \times R_2 / (R_3 + r_{w1} + R_2)] + R_1}$$

Scenario THREE—When all the sensor pins i.e. the pair of parallel sensor pins (44, 45) and the pair of series sensor pins (41, 42) are surrounded by undesired fluid having low resistivity which implies a lower ohmic value between the pair of parallel sensor pins (44, 45) than R3 (55), as well as a lower ohmic value between the pair of serial sensor pins (41, 42) than the resistance R3 (55); in such a situation, the potential output VE (50) is less than 40% of the source voltage Vcc (51). FIG. 6

Algebraically, $VE = Vcc \times R_{2'}/(R_{1'}+R_{2'})$

Figure 7:
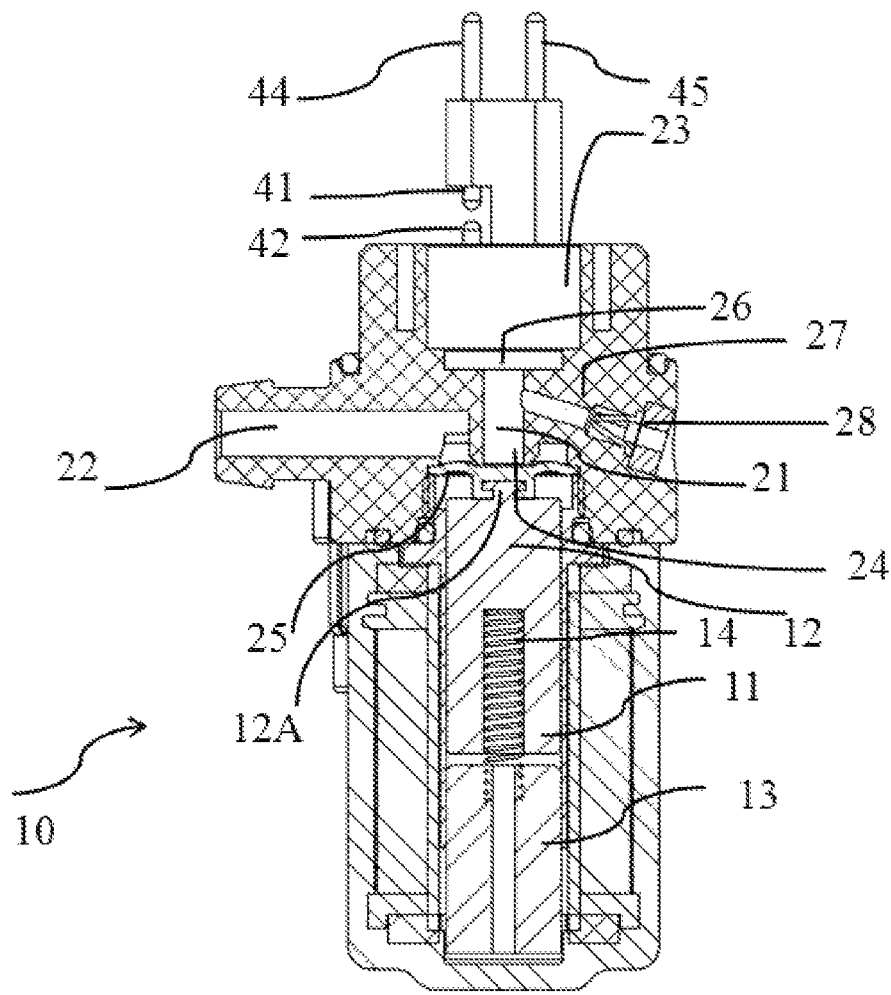
FIG. 7 shows the sectional view of the solenoid operated unit with an electrical arrangement, an electro-mechanical arrangement and a mechanical arrangement.

Where, $R_{2'} = (R_3 + rw1) \times R_2/(R_3 + r_{w1} + R_2)$ $R_{3'} = R_3 \times r_{w2}/(R_3 + r_{w2})$ The solenoid operated unit (10) also has an electro-mechanical arrangement as shown in FIG. 7. The electro-mechanical arrangement comprises of a static core (13) which is fixed and which is made of a ferromagnetic material, a solenoid (11), a plunger (12) which is movable and which is made of a ferromagnetic material surrounding or surrounded by a solenoid (11).

The solenoid operated unit (10) also has a mechanical arrangement as shown in FIG. 7. The mechanical arrangement comprises of a vertical bleeding path (21) and an exit path (22). The vertical bleeding path (21) has a sump (23) at a top end, an upper opening (26) at a top end and a lower opening (24) at a bottom end. An exit path (22) is connected and disconnected with the lower opening (24) by a dual function diaphragm (25). The mechanical arrangement also comprises of a compression spring (14) which keeps the plunger (12) away from the static core (13) when the solenoid (11) is de-energized.

Figure 8:
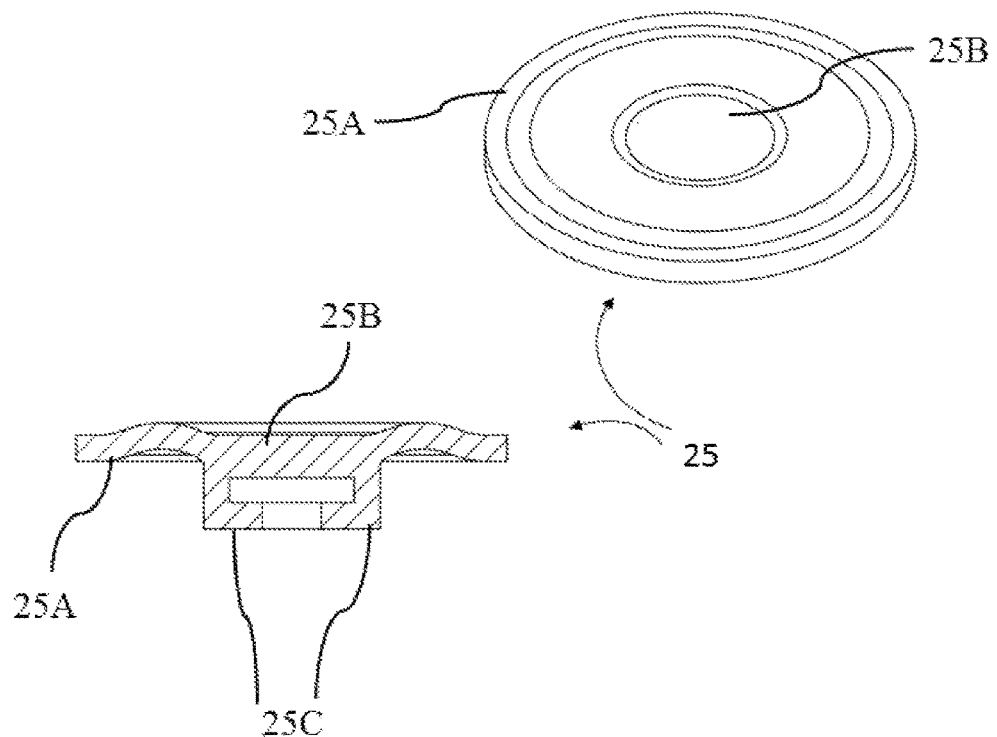
FIG. 8 shows a perspective view and a sectional view of a dual function diaphragm.

The dual function diaphragm (25), shown in FIG. 8, is made of a soft material like natural rubber, neoprene, Viton, nitrile rubber, et cetera, having compatibility to work in fluids that the solenoid operated unit (10) is used for. An annular part (25A) of the dual function diaphragm seals and insulates the electro-mechanical arrangement from the mechanical arrangement so that either fluid cannot enter the electro-mechanical arrangement at all times. Consequently, any contamination present in the fluid cannot enter the electro-mechanical arrangement. The mechanical clearances around the plunger are in fractions of millimeters and ingress of contamination of sizes of the order of 100 to 300 microns can result into jamming the plunger, making any solenoid operated units unsuitable for such functions. The annular part (25A) of the dual function diaphragm (25) eliminates this possibility in the design disclosed here.

As shown in FIGS. 7 and 8, a nuclear part (25B) of the dual function diaphragm (25) blocks and unblocks the lower opening (24) of the vertical bleeding path (21) and thereby, correspondingly, disconnects and connects the lower opening (24) from the exit path (22). A head (12A) of the plunger (12) is gripped by a cap like construction (25C) provided on the other side of the nuclear part (25B) such that a rectilinear movement of the plunger (12) results in corresponding movement of the annular part (25A). The dual function diaphragm (25) performs two functions—(a) sealing and insulating the mechanical arrangement from the electromechanical arrangement, and (b) connecting and disconnecting the vertical bleeding path (21) with the exit path (22)

Figure 9:
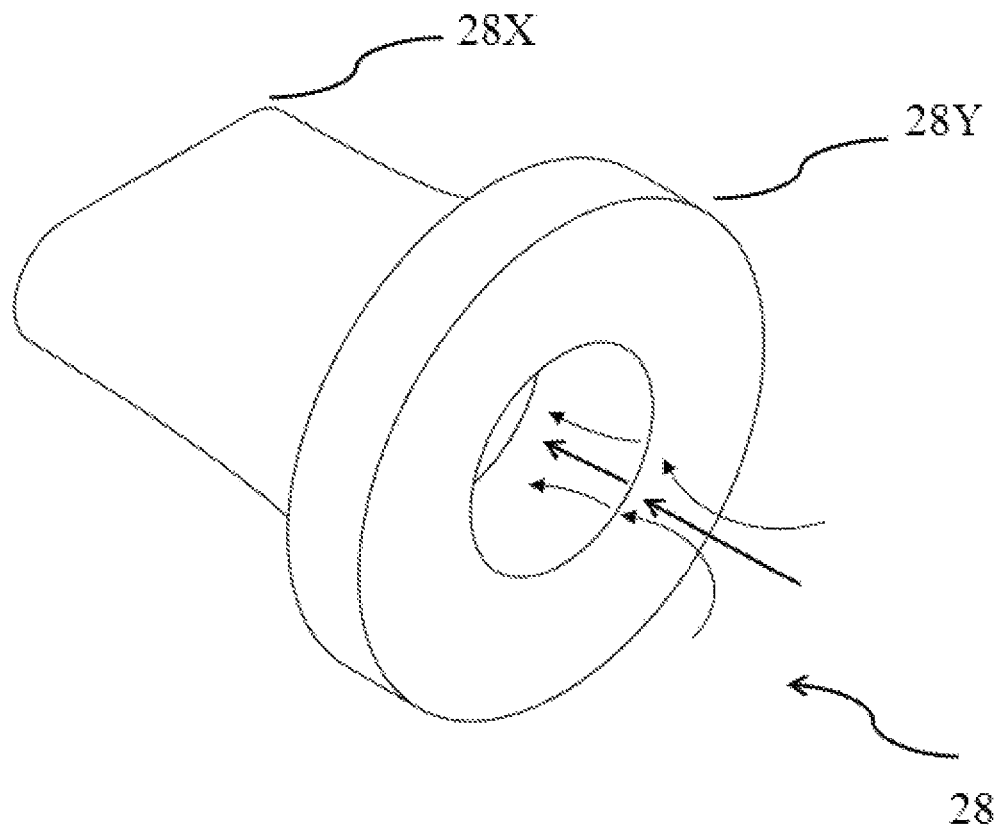
FIG. 9 shows a perspective view giving functional representation of a compensation valve and the direction of flow.

The mechanical arrangement also comprises of a pressure equalization outlet (27), which has provision to provide a compensation valve (28), as shown in FIGS. 7 and 9. The compensation valve (28) is essentially a unidirectional valve or a non-return valve of any known construction like a ball and seat, a flapper, a duckbill, et cetera whose one end is open to the atmosphere, thus termed as an atmospheric pressure end (28Y), and the other end, termed as an inner end (28X) is connected towards the bleeding path (21). The compensation valve (28) allows fluid flow from the atmospheric pressure end (28Y) to the inner end (28X) under differential pressure, but NOT in the reverse direction. FIG. 9 is merely a functional representation of a compensation valve (28).

Figure 10:
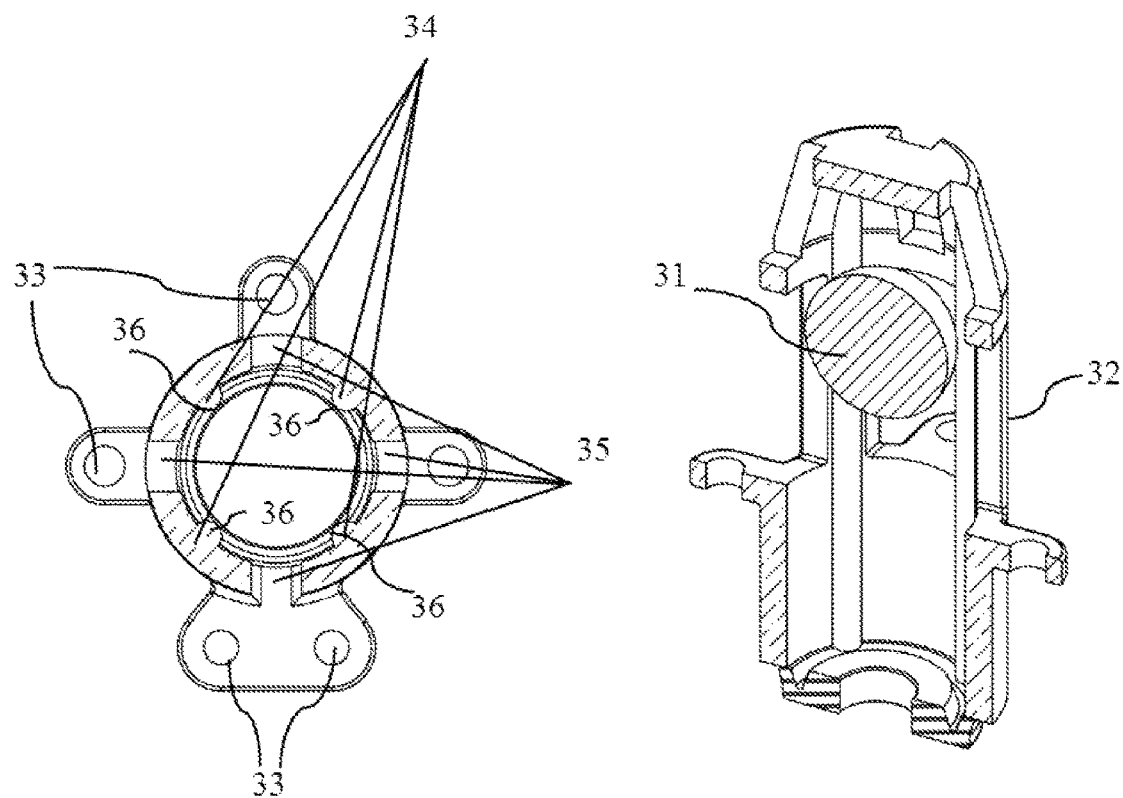
FIG. 10 shows a perspective sectional view and a top sectional view of a modular mechanical sensor assembly.
Figure 11:
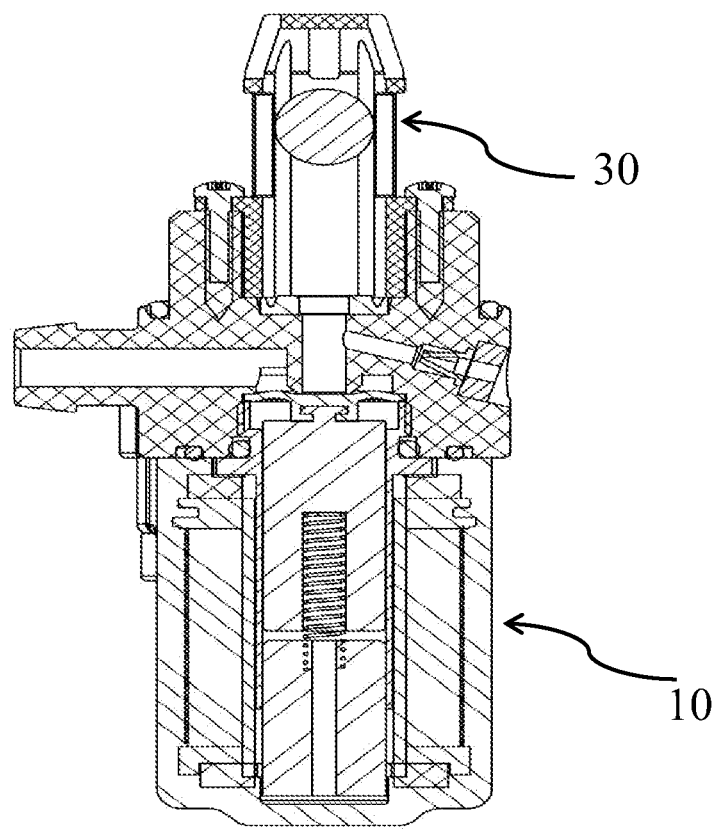
FIG. 11 shows a sectional front view of the modular mechanical assembly mounted on the solenoid operated unit.

The mechanical arrangement also has provision for providing a modular mechanical sensor assembly (30), as shown in FIG. 10 and FIG. 11. The modular mechanical sensor assembly (30) comprises of a spherical ball (31) and a tunnel (32). The spherical ball (31) is made of such a material that the spherical ball floats on the undesired liquid, here water (28), while the spherical ball sinks in the desired liquid, here, diesel (29). The spherical ball is trapped in the tunnel (32). The tunnel (32) is closed at one end. The tunnel has a plurality of pressure equalizing openings (35) all around its length. The tunnel (32) also has a plurality of convex guides (34) all along its length. The plurality of convex guides (34) has a point contact (36) with the spherical ball (31) so as to cause a minimum friction during an up and down movement of the spherical ball (31). The tunnel has provisions (33) for fixation on top of the solenoid operated unit (10). When the modular mechanical sensor assembly (30) is fixed on the solenoid operated unit (10), and the vessel (40) has the desired fluid, the spherical ball sinks and sits on the upper opening (26) such that the spherical ball blocks the opening completely and the desired fluid cannot enter the vertical bleeding path (21).

The pressure equalizing openings (35), shown in FIG. 10, are essentially a plurality of openings all around a cylindrical part of the tunnel, located such that a fluid pressure around the spherical ball (31) is uniform and the spherical ball (31) suspends freely. In other words, the spherical ball (31) does not have the tendency to sit asymmetrically in the tunnel. This is important for a smooth up and down movement of the spherical ball (31). In absence of the pressure equalizing openings (35) in the manner disclosed here and in FIG. 10, the spherical ball (31) is likely to get stuck randomly in the tunnel, failing to perform its function of freely moving in accordance with the specific gravity of the fluid surrounding it.

When the solenoid (11) is de-energized, the plunger (12) and the static core (13) do not have a magnetic behavior. Due to the presence of the compression spring (14), the plunger (12) remains away from the static core (13). In turn, the plunger (12) pushes the annular part (25A) of the dual function diaphragm (25) on to the lower opening (24) of the vertical bleeding path (21), thereby blocking the lower opening (24) and disconnecting the lower opening (24) from the exit path (22). When the solenoid (11) is energized, the plunger (12) and the static core (13) get magnetized with opposite polarity facing each other and the plunger (12) gets pulled by the static core (13) after overcoming the force of compression spring (14). In this condition, the annular part (25A) of the dual function diaphragm (25) moves away from the lower opening (24) thereby connecting the exit path (22) with the lower opening (24).

The solenoid operated unit (10) operates as follows:

When the vessel (40) is filled with the desired fluid, all the sensor pins are surrounded by desired fluid having high resistivity, creating scenario ONE, as shown in FIG. 4. The potential output VE (50) is higher than the pre-set trigger value; and the solenoid (11) remain de-energized. The plunger (12) keeps the annular ring (25A) pushed against the lower opening (24). Hence desired fluid cannot come out.

When undesired fluid, here water (28), having higher specific gravity than the desired fluid, here diesel (29), is present in the diesel (29), the water (28) settles down and the level of water (28) starts rising till the water (28) surrounds the pair of serial sensor pins (41, 42) resulting into scenario TWO, as shown in FIG. 2. The solenoid (11) continues to remain de-energized and thus the lower opening (24) remains blocked by the nuclear part (25B) of the dual function diaphragm (25). As the level of the water (28) rises further so as to touch the pair of parallel sensor pins (44, 45), scenario THREE is achieved, resulting into the potential output VE (50) falling below the pre-set trigger value which causes the control unit to energize the solenoid (11). Consequently, the plunger (12) and the static core (13) get magnetized and the plunger (12) is pulled towards the static core (13) as seen in FIG. 3 and FIG. 7. It further results in the nuclear part (25B) unblocking the lower opening (24) and the vertical bleeding path (21) joins with the exit path (22) and the water (28) is enabled to be bled out due to the pressure of the column of diesel (29) above the water (28).

The control unit keeps the solenoid (11) energized till scenario TWO situation re-occurs.

Since the water (28) is trapped below the diesel (29), a vacuum starts getting created as the water (28) bleeds and the exiting of water (28) becomes intermittent and slow. The pressure equalization outlet (27) is provided to resolve this conflict. The vacuum results into a differential pressure with respect to the atmospheric pressure and the compensation valve (28) allows the in-flow of atmospheric air from the atmospheric pressure end (28Y) to the inner end (28X) into the vertical bleeding path (21). The atmospheric air reaches the vessel (40) through the upper opening (26) of the vertical bleeding path (21) and pressure equalization happens. This process continues. Consequently, the exiting of water is smooth and speedy.

As the water (28) drains out and its level falls resulting into scenario TWO, the solenoid (11) de energizes through the control unit. This causes the plunger (12) to be pushed away from the static core (13) and the head (12A) of the plunger (12) pushes up the nuclear part (25B) of the dual function diaphragm (25). The nuclear part (25B) of the dual function diaphragm (25) blocks the lower opening (24) thus.

The modular mechanical sensor assembly (30), when mounted on the solenoid operated unit (10) provides redundancy in order to ensure that in no circumstances the desired fluid is drained out. Consequent to any malfunction, whether mechanical or electro-mechanical, if the plunger (12) remains in energized or interim position while the water level has fallen below the pair of serial sensor pins (41, 42), the spherical ball (31) sinks and sits on the upper opening (26) and blocks the upper opening (26) completely, thus preventing unwanted drainage of the desired fluid, here, diesel (29). The malfunction could be—compression spring losing its strength, coil failing to de-energize, permanent magnetism setting in the plunger and or in the static core, the plunger getting stuck, or any other failure.

The energizing and de-energizing of the solenoid is executed by the control unit, by virtue of processing the potential output VE (50) as generated in scenario ONE, scenario TWO and scenario THREE. Therefore, several permutations and combinations of energizing and de-energizing the solenoid (11) exist, and the description provided hereinabove should not be construed to limit the invention.

As an example, the vessel (40) may have provision to measure temperature and the control unit may energize and de-energize the solenoid according to desired temperature parameters, processed in consonance with the scenario ONE, scenario TWO and or scenario THREE.

There are applications where a pressure higher than the atmospheric pressure is maintained in the vessel (40). For such applications with pressurized vessel, the compensation valve (28) is not needed and therefore not provided in the pressure equalization outlet (27) of the solenoid operated unit (10).

The mechanical construction to link the diaphragm and the plunger described here is illustrative and uncounted ways exist to achieve such linking so that plunger movement causes diaphragm movement.

The term density and specific gravity are used interchangeably.

The term liquid and fluid are used interchangeably.

The invention claimed is:

1. A solenoid operated unit for detecting and bleeding an undesired liquid present with a desired liquid of a different resistivity and a different specific gravity, the two liquids being immiscible with each other, the solenoid operated unit comprising of a solenoid, a static core, a plunger, at least one compression spring, characterized in that the solenoid operated unit has:
   a. a pair of parallel sensor pins at a distance from each other such that an ohmic value of a resistance between them is less than a resistance R3 when the pair of parallel sensor pins is surrounded by the undesired liquid, and an ohmic value of a resistance between them is significantly higher than the resistance R3 when the pair of parallel sensor pins is surrounded by the desired liquid;
   b. a pair of serial sensor pins at a distance from each other such that an ohmic value of a resistance between them is less than the resistance R3 when the pair of serial sensor pins is surrounded by the undesired fluid, and an ohmic value of resistance between them is significantly higher than the resistance R3 when the pair of serial sensor pins is surrounded by the desired fluid;
   c. a vertical bleeding path, having an upper opening and a lower opening;
   d. an exit path connected and disconnected with the lower opening of the vertical bleeding path;
   e. a dual function diaphragm having an annular part, a nuclear part and a cap like construction on an other side of the nuclear part;
   f. a pressure equalization outlet; and
   g. a modular mechanical sensor assembly having a tunnel with a plurality of pressure equalizing openings all round its length and having a plurality of convex guides all along its length, and a spherical ball.

2. The solenoid operated unit as claimed in claim 1, wherein the annular part of the dual function diaphragm seals and insulates an electro-mechanical arrangement from a mechanical arrangement so that either of the fluids and a contamination present therein cannot enter the electro-mechanical arrangement at all times.

3. The solenoid operated unit as claimed in claim 1, wherein the plunger at its head is gripped by the cap like construction provided on the other side of the nuclear part of the dual function diaphragm such that a rectilinear movement of the plunger results in a corresponding movement of the nuclear part.

4. The solenoid operated unit as claimed in claim 1, wherein the lower opening of the vertical bleeding path is blocked by the nuclear part of the dual function diaphragm when the solenoid is de-energized.

5. The solenoid operated unit as claimed in claim 1, wherein the lower opening of the vertical bleeding path is unblocked by the nuclear part of the dual function diaphragm when the solenoid is energized.

6. The solenoid operated unit as claimed in claim 1, wherein the pressure equalization outlet is provided with a compensation valve.

7. The solenoid operated unit as claimed in claim 6, wherein the compensation valve allows fluid flow from an atmospheric pressure end of the compensation valve to an inner end of the compensation valve when there is a differential pressure.

8. The solenoid operated unit as claimed in claim 1 wherein the upper opening of the vertical bleeding path is blocked by the spherical ball of the modular mechanical sensor assembly when the spherical ball is surrounded by the undesired fluid.

9. The solenoid operated unit as claimed in claim 1 wherein the tunnel of the mechanical sensor assembly has provisions for fixation on top of the solenoid operated unit.

10. The solenoid operated unit as claimed in claim 1 wherein the plurality of pressure equalizing openings are located such that a fluid pressure around the spherical ball is uniform and the spherical ball suspends freely, without having a tendency to sit asymmetrically in the tunnel.

11. The solenoid operated unit as claimed in claim 1 wherein the plurality of convex guides have a point contact with the spherical ball so as to cause minimum friction during the up and down movement of the spherical ball.

\* \* \* \* \*